(12) United States Patent
McCary

(10) Patent No.: US 7,634,735 B2
(45) Date of Patent: Dec. 15, 2009

(54) COLLABORATIVE PLATFORM

(76) Inventor: David W. McCary, 30 Ledyard Rd., West Hartford, CT (US) 06117

( * ) Notice: Subject to any disclaimer, the term of this patent is extended or adjusted under 35 U.S.C. 154(b) by 448 days.

(21) Appl. No.: 11/285,821

(22) Filed: Nov. 23, 2005

(65) Prior Publication Data

US 2006/0129942 A1 Jun. 15, 2006

Related U.S. Application Data

(60) Provisional application No. 60/630,619, filed on Nov. 24, 2004, provisional application No. 60/704,653, filed on Aug. 1, 2005.

(51) Int. Cl.
*G06F 3/00* (2006.01)
*G06F 12/00* (2006.01)
*G06F 9/44* (2006.01)

(52) U.S. Cl. .................. 715/741; 715/744; 715/751; 715/762; 707/200; 717/101

(58) Field of Classification Search ............. 715/741, 715/744, 751, 762; 719/328; 709/223; 707/200; 717/101
See application file for complete search history.

(56) References Cited

U.S. PATENT DOCUMENTS

| 7,062,532 | B1 * | 6/2006 | Sweat et al. ............ 709/205 |
| 2002/0012434 | A1 * | 1/2002 | Frederiksen et al. ...... 380/277 |
| 2002/0161865 | A1 * | 10/2002 | Nguyen .................. 709/220 |
| 2004/0003247 | A1 * | 1/2004 | Fraser et al. ............ 713/169 |
| 2004/0103280 | A1 * | 5/2004 | Balfanz et al. .......... 713/169 |
| 2005/0246627 | A1 * | 11/2005 | Sayed .................... 715/513 |

* cited by examiner

Primary Examiner—Ting Zhou
(74) Attorney, Agent, or Firm—Steven M McHugh

(57) ABSTRACT

A system and method for providing a collaborative platform, the system including a server configured to create a collaborative back room folder environment on the server in response to a request from a renter, wherein the collaborative back room folder environment includes at least one parameter configurable by the renter, and wherein the collaborative back room folder environment is capable of supporting an exchange of information between a plurality of computers wherein the information is configurable by the renter.

20 Claims, 16 Drawing Sheets

Home | Administration | Help

Web site Administration for "http://www.net-rooms.com

Use this page to administer your Web site. By using the links on this page, you can perform ta
inviting people to your site, configuring settings for your Web site, and adding or deleting a sul

Users and Roles

The links below take you to administration pages where you can perform tasks such
to users, and inviting users to your Web site.

Anonymous browsing disabled
▫ Change anonymous access settings

Using unique permissions
▫ Change subweb permissions

▫ Manage users
▫ Manage roles
▫ Send an invitation

Server Health

The link below takes you to an administration page where you can recalculate the w ▫ Recalculate the web

Version Control

The link below takes you to an administration page where you can enable source co ▫ Configure version control

Subwebs

The links below take you to administration pages where you can create, merge, or c
subweb settings. The following subwebs have been created for: "http://www.net-ro-
administration page for a particular subweb, click the subweb name. To view the ho
the URL.

▫ Create a subweb

Figure 16

COLLABORATIVE PLATFORM

CROSS REFERENCE TO RELATED APPLICATIONS

This application claims the benefit of U.S. Provisional Patent Application No. 60/630,619, filed Nov. 24, 2004 and entitled "Collaborative Web Site Platform" and U.S. Provisional Patent Application No. 60/704,653, filed Aug. 1, 2005 and entitled "Collaborative Web Site Platform", both of which are incorporated herein by reference in their entirety.

FIELD OF THE INVENTION

This invention relates generally to Internet based services, and more particularly to an easily configurable collaborative Platform utilizing private Internet based portals to transfer information.

BACKGROUND OF THE INVENTION

As more businesses become 'connected' and begin to operate on a National and/or International level, the need for the exchange of information over long distances increases. One way to accomplish the exchange of information involves transferring the information via 'hard' mailing techniques, such as by sending volumes of paper via traditional mailing services, such as Federal Express, UPS and US Postal Service, or by facilitating the information exchange via a courier. Unfortunately however, this type of transfer method can be expensive, time consuming and impractical depending on the volume of information to be exchanged. Additionally, because the information is transferred via paper copy, the paper copy must be physically delivered to the desired location. Depending upon the desired location, the time required for transfer may be days.

Another way to accomplish the exchange of information involves using electronic transfer devices to facilitate the transfer, such as via a facsimile or electronic mailing (E-Mail) device. Unfortunately however, although this method has been around for several years and is typically much more efficient than the physical transfer of information, both in cost and time, this method becomes less efficient and cost effective as the volume and sensitivity of the information increases. For example, sending large amounts of information via email may not be a viable option if the email servers of both the sender and receiver need to be secure servers or cannot support large files. Another problem occurs when the information being exchanged needs to be discussed by multiple parties disposed in multiple locations. Unfortunately, this type of communication, or 'Internet collaboration' setup, raises several issues on information security and the technical sophistication of the parties involved.

In order to address these concerns, several services for Internet collaboration have been developed, including Internet based services, such as Intranets.com, iceboxportal.com, teamworkzone.com and wiki.org, which provide for extranet communication or Internet collaboration. Unfortunately however, these services currently have several drawbacks. First, in order to access and take full advantage of these services, the users must have a considerable amount of technical expertise involving Internet systems and communications. This is a skill the average business person does not have without hiring an IT professional. Second, these services typically require specialized software to facilitate and operate. This is an added cost to the user. Third, the level of information security provided by these services is typically not sufficient to prevent the intrusion of unwanted parties or the dissemination of sensitive information.

SUMMARY OF THE INVENTION

A system for providing a collaborative platform is provided, wherein the system includes a server configured to create a collaborative back room folder environment on the server in response to a request from a renter, wherein the collaborative back room folder environment includes at least one parameter configurable by the renter, and wherein the collaborative back room folder environment is capable of supporting an exchange of information between a plurality of computers, wherein the information is configurable by the renter.

A method for providing a collaboration platform is provided, wherein the method includes receiving a request from a renter to create a collaborative back room folder environment and creating the collaborative back room folder environment on a server in response to the request, wherein the collaborative back room folder environment includes at least one parameter configurable by the renter and wherein the collaborative back room folder environment is capable of supporting an exchange of information between a plurality of computers, wherein the information is configurable by the renter.

A machine readable computer program code encoded onto a storage medium is provided, wherein the program code includes instructions for causing a controller to implement a method for providing a Web-based collaboration platform. The method includes receiving a request from a renter to create a collaborative back room folder environment and creating the collaborative back room folder environment on a server in response to the request, wherein the collaborative back room folder environment includes at least one parameter configurable by the renter, and wherein the collaborative back room folder environment is capable of supporting an exchange of information between a plurality of computers, wherein the information is configurable by the renter.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIG. 16 is a screen shot illustrating a private room administration page, in accordance with the present invention.

DETAILED DESCRIPTION

Figure 1:
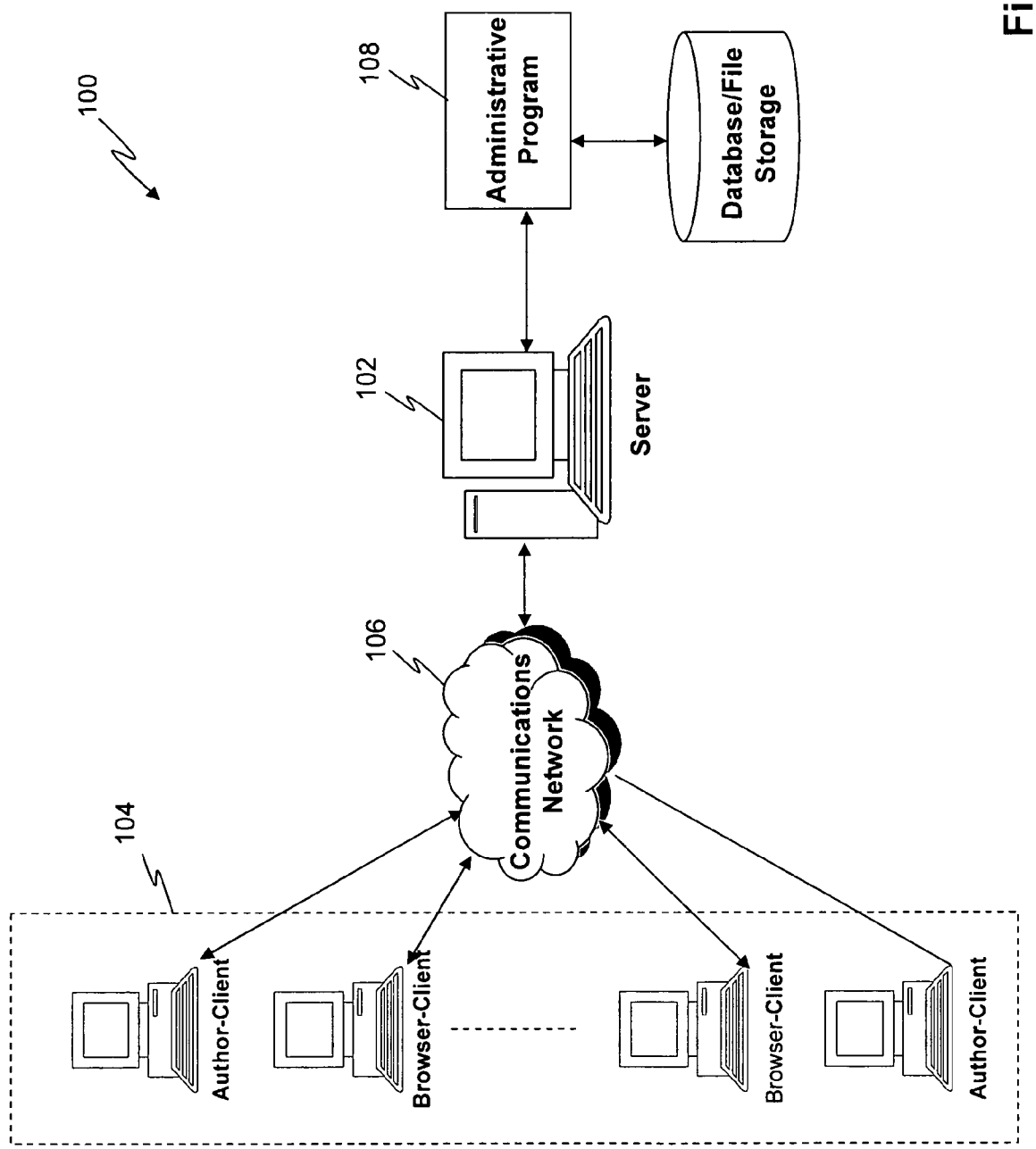
FIG. 1 is a schematic diagram depicting a computer network employing a collaborative platform in accordance with the present invention.

In accordance with the present invention, the collaborative platform provides a user friendly environment where a non-technical user (i.e. renter) may easily setup a secure folder using the provided setup forms and designate guests who can also securely access the folder, wherein the renter and/or guests may easily drag and drop files to share into the secure folder using existing Microsoft® Windows desktop folder setup and browsing software (i.e. "add a network place wizard" and Windows Explorer). Moreover, the renter may also easily create (with common software, such as Microsoft® Word) a secure collaborative environment overlay on the secure folder enabling them to share some or all of their files via common web access software, such as Internet Explorer, with little or no knowledge of HTML or Internet publishing tools such as Microsoft FrontPage. This may be accomplished using a secure transport protocol called SSL (Secure Socket Layer) and by using Web capable software, such as Microsoft® Office, which support direct access to Web site folders by simply substituting the Web site address, (i.e. Universal Resource Locator or URL) for what would normally be a drive letter or file path. As such, the present invention enables the non-technical renter/user to securely share information and create a secure Web site independent of Information Technology (IT) professionals.

It should be appreciated that the collaborative platform allows a renter/user to create a user friendly Web folder with names such as "My Net-room" instead of using the longer URL, wherein the renter/user may organize information in a free form fashion and present and/or share the information with other users without having to learn Web site development technologies. This differs widely from current art which use browser GUI's to organize existing documents stored on a computer and forces the user into an existing presentation structure, by circumventing the complexity of Web site development and a highly structured and inflexible Web site. For example, one way this may be accomplished would be by the collaborative platform functioning via a helper application which supports the HTTP/Web Distributed Authoring and Versioning (WebDAV) protocol. Since WebDAV is an extension to HTTP/1.1, it can more easily be used across firewalls. Additionally, because WebDAV is a standard protocol, there are more choices available for the client platform and client programming language. Moreover, the collaborative platform may use both SSL and a strong password policy to insure data security.

It should be appreciated that although the collaborative platform may support known server extensions and services, such as FrontPage 2002, FrontPage 2000, FrontPage extensions and by SharePoint Services, which provide basic site management capabilities to administer the sites and user roles, the collaborative platform is not limited to these server extensions and services and may support any server extensions and services suitable to the desired end purpose including proprietary server extensions and services. An example of some components that use FrontPage 2002 extensions are File Upload, Custom link bars, Shared border background properties, Usage analysis reports, Top Ten List Web Component and New Security Features (i.e. user roles). Additionally, some components that use FrontPage 2000 Server Extensions or later are Nested Sub Webs, Lightweight Source Control (document check-in/check-out without Microsoft® Visual SourceSafe for Windows), Categories component and Style Sheet links to multiple files or Active Server Pages (ASP) files. Furthermore, some components that use FrontPage Server Extensions or later are Confirmation field, Discussion form handler, FrontPage-created server-side image maps, Hit counter, Registration form handler, Save Results form handler, Search form and Field set. Moreover, some components that use a Web that is based on SharePoint Team Services are Document Library, List, Survey, Discussion Board, List and Document Library views, List Forms and SharePoint Team Web Site Wizard. Furthermore, the collaborative platform may also use ASP pages, an ISAPI Filter and proprietary extensions, such as Version control, Backup, Cross site lists, Secure Email, Additional Security Features, Monitoring and SQL Logging Routines.

Referring to FIG. 1, a schematic block diagram of a computer network 100 for implementing a collaborative platform is shown and includes a Web server (Net-room™ server) computer 102 connected to at least one client computer 104 via a communications network 106, such as the Internet. The Web server computer 102 may be configured to operate an administrative program 108 which may or may not be resident on the Web server computer 102 and which provides the software and ability to create and maintain a collaborative platform for use by a user via the client computer 104, wherein the collaborative platform may allow for at least one client computer 104 to share information, such as text, photos and/or links to additional pages located within Net-Rooms, out on the Internet and/or underlying files (jpg. Word, excel, mp3, etc), with other client computers 104, either individually or in groups, in a secure and user friendly environment using common and standard Microsoft Windows® applications, such as Network Neighborhood and/or Microsoft® Word. The administrative program 108 may be configured to allow a user to use or rent a Web site for a predetermined period of time, such as hours, days, months and/or years, wherein the predetermine period of time may be a single event and/or a recurring period of time on a predetermined schedule, such as daily, weekly, monthly and/or yearly. Additionally, as discussed hereinafter, the administrative program 108 may be configured allow a renter to assign access (permission) levels to clients as desired, such as "administrator access level", "author access level" and/or "browser access level", to individual clients and/or to groups of clients which may allow the client access to the entire private room 110 or which may restrict client access to one or more files, folder and/or private rooms 110 on the Web site.

Figure 2:
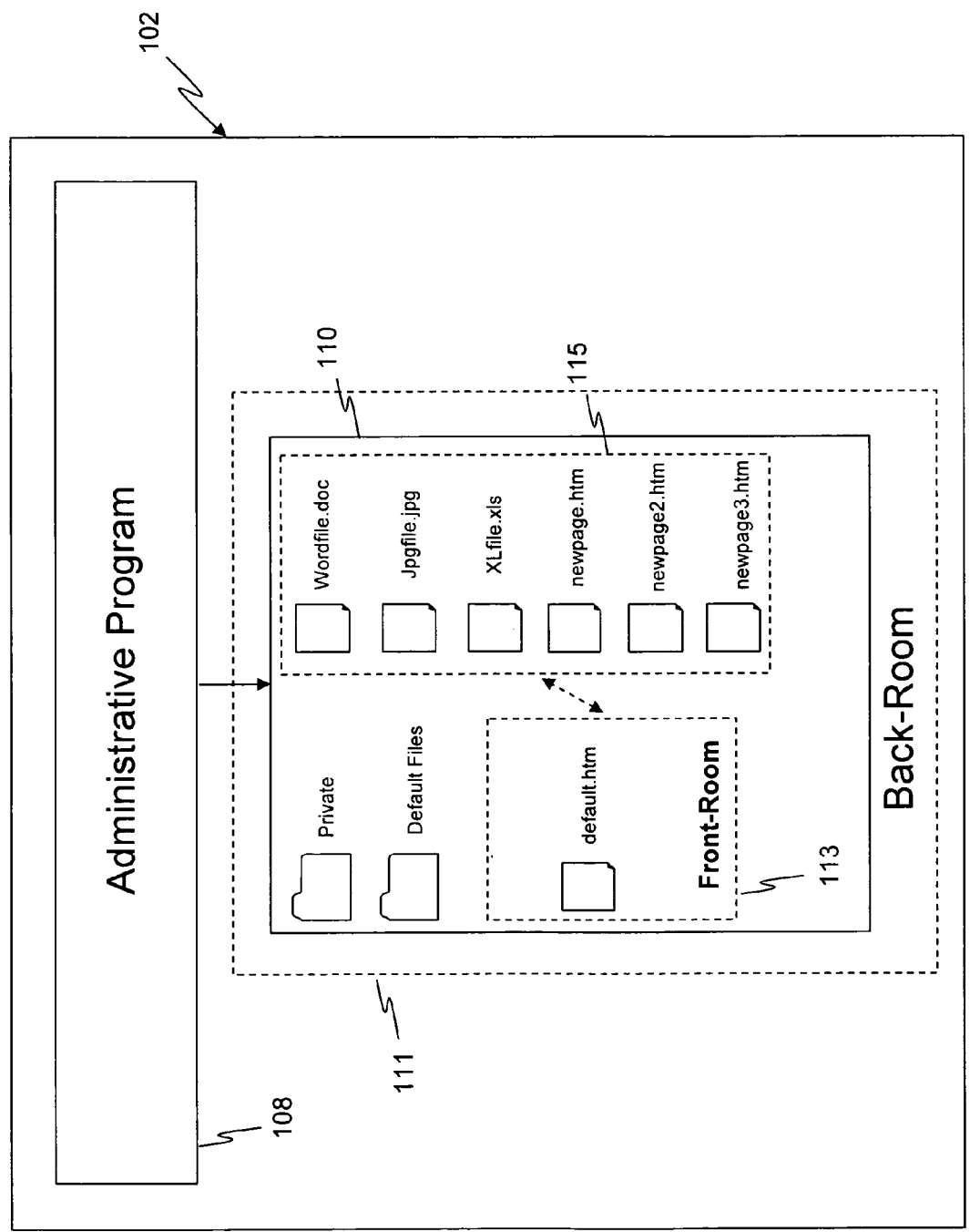
FIG. 2 is a schematic block diagram depicting a collaborative platform in accordance with a first embodiment.

Referring to FIG. 2, a block diagram illustrating the hierarchy of one embodiment of a collaborative platform 111 in accordance with the present invention is illustrated and discussed. In this embodiment, the Web server computer 102 may include the administrative program 108 which, at the request of a renter, creates a back-room or private room 110. As discussed hereinafter, the renter may then transfer information into the private room 110, as discussed hereinafter, for easily accessible data storage and/or modification and/or for later transfer to a client computer 104, such as files and/or folders containing information. Also as discussed hereinafter, the renter may create one or more front rooms 113 which provide access to information 115 disposed within the back room environment 110 or external to the back room environment 110, such as documents, applications, files, folders and web pages, wherein the front room 113 may be a default.htm file 113 and may include a hyperlink to the information 115, wherein the information may be any type of document, application, file, folder and/or Web page suitable to the desired end purpose.

Figure 3:
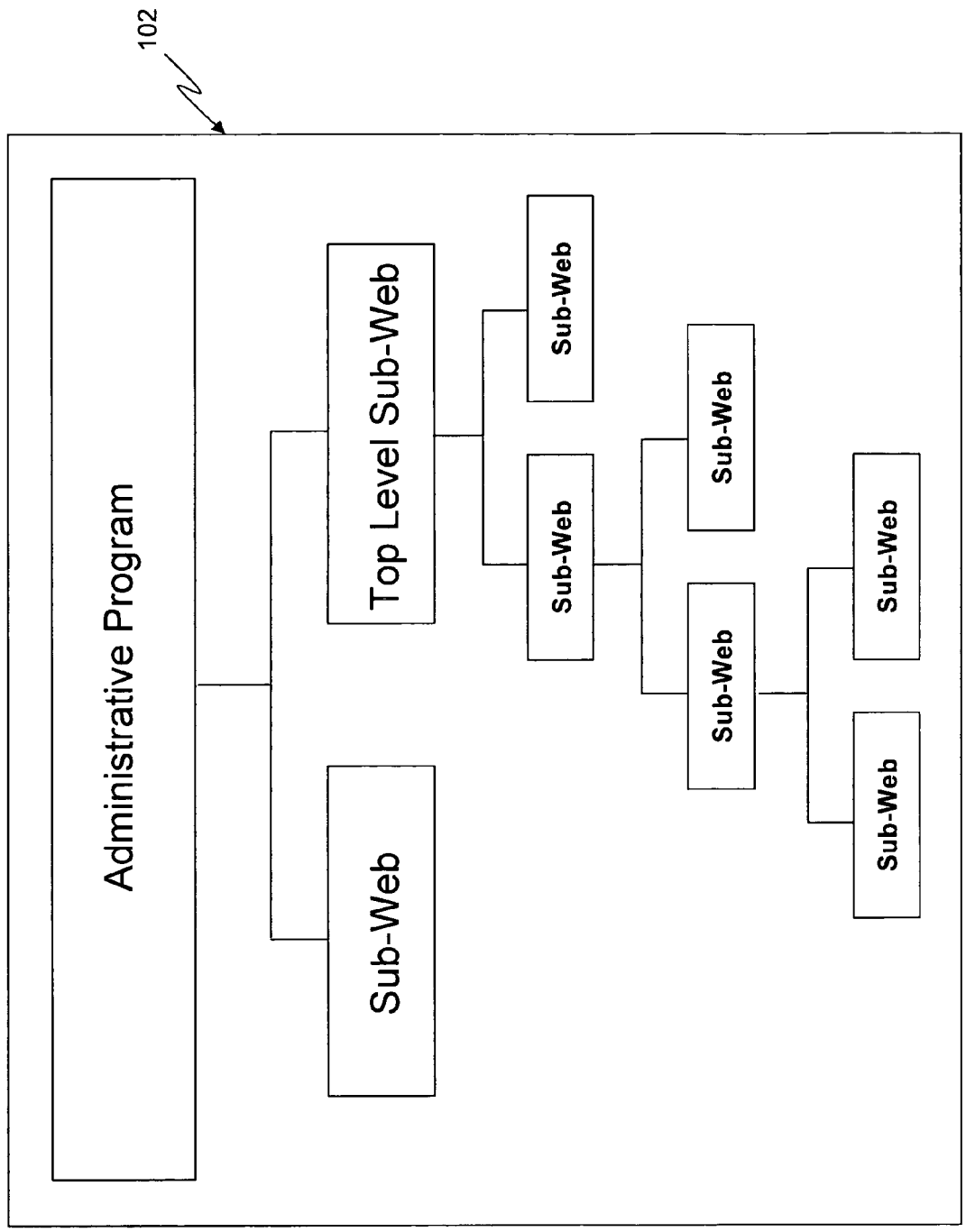
FIG. 3 is a schematic block diagram depicting a collaborative platform in accordance with a second embodiment.
Figure 4:
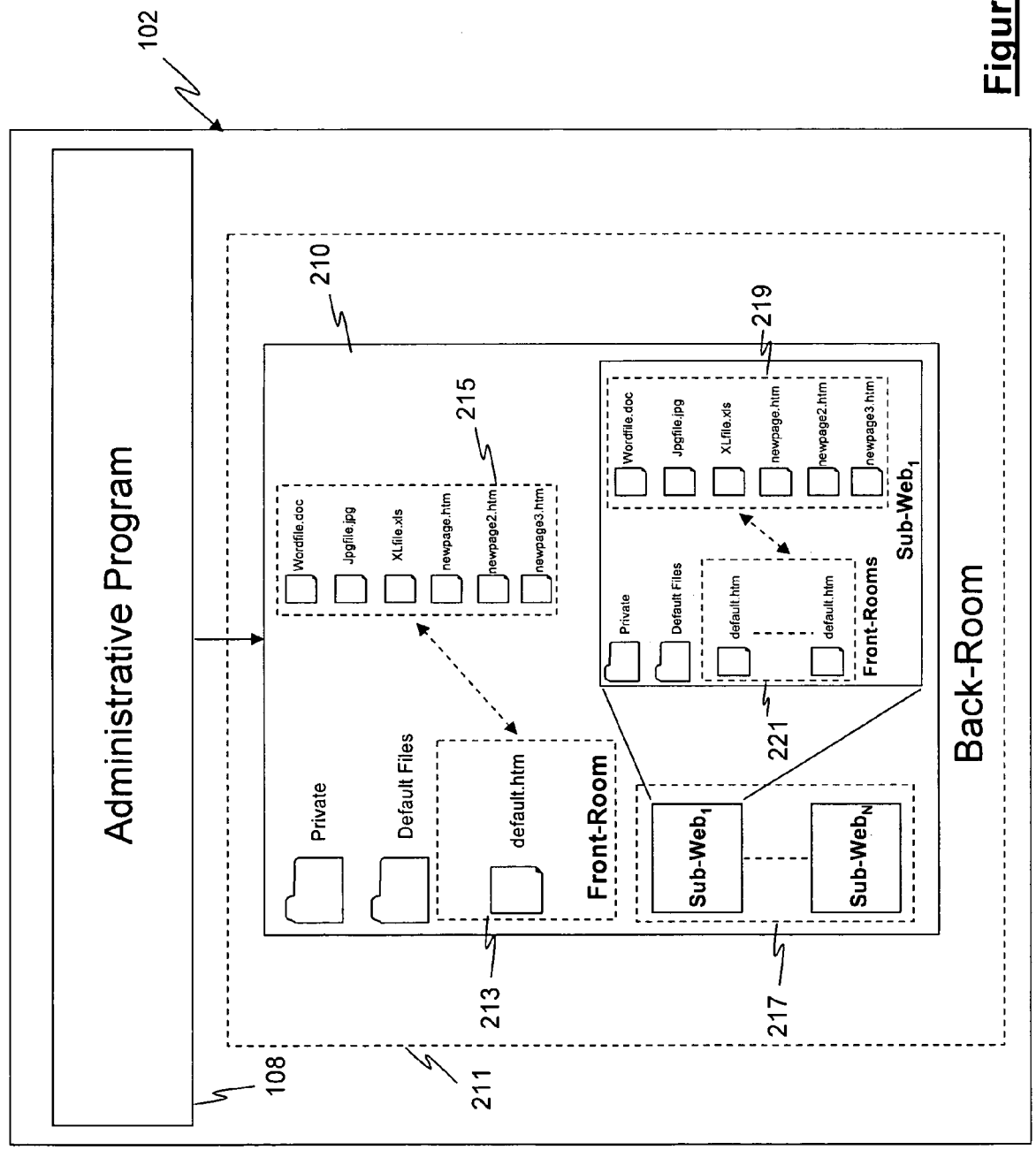
FIG. 4 is a schematic block diagram depicting the collaborative platform of FIG. 3.

Referring to FIG. 3 and FIG. 4, a block diagram illustrating the hierarchy of an additional embodiment of a collaborative platform 211 in accordance with the present invention is illustrated and discussed. In this embodiment, the Web server computer 102 may include the administrative program 108 which, at the request of a renter, creates a back-room or private room 210. As discussed hereinafter, the renter may then transfer information into the private room 210, as discussed hereinafter, for easily accessible data storage and/or for later transfer to a client computer 104, such as files and/or folders containing information. Also as discussed hereinafter, the renter may create one or more front-rooms 213 which provide access to information 215 disposed within the back room environment 210 or external to the back room environment 210, such as documents, applications, files, folders and web pages, wherein the front room 213 may be a default.htm file 213 and may include a hyperlink to the information 215, wherein the information may be any type of document, application, file, folder and/or Web page suitable to the desired end purpose. Additionally, the renter may create "sub-level" back-rooms or sub-webs 217 internal to and/or external to the renter's domain, wherein each of these sub-webs 217 may have all of the attributes of the top-level back-room 210, such as one or more front-rooms 221 which provide access to information 219 disposed within the sub-web environment 217 or external to the back room sub-web environment 217, such as documents, applications, files, folders and web pages, wherein the front room 221 may be a default.htm file 221 and may include a hyperlink to the information 219, wherein the information may be any type of document, application, file, folder and/or Web page suitable to the desired end purpose. It should be appreciated that this type of parent-child relationship may be expanded to include grandparent-parent-child relationships and so on, as desired. It should also be appreciated that each of the sub-webs may also be associated with other sub-webs via a sibling-sibling relationship (i.e. sub-webs within the same back-room being linked to each other) or via a cousin-cousin relationship (i.e. sub-webs within different back-rooms being linked to each other).

Figure 5:
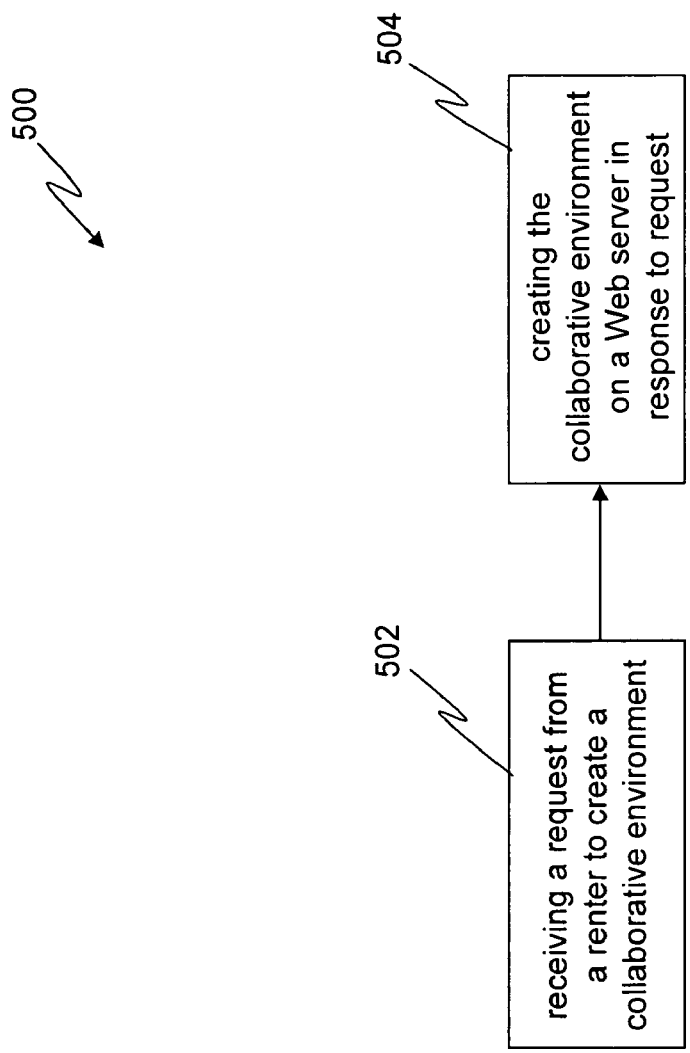
FIG. 5 is a block diagram illustrating a method for providing the collaborative platform in FIG. 2 and FIG. 3.

Referring to FIG. 5, a block diagram illustrating a method 500 for providing a Web-based collaboration platform is shown and includes receiving a request from a renter to create a collaborative environment, as shown in operational block 502. It should be appreciated that the renter may submit the request via any method suitable to the desired end purpose, such as via telephone, Internet, Email and/or Facsimile. Upon receipt of the renter request, a collaborative environment is created on the Web server computer 102 in response to the request, as shown in operational block 504. This may be accomplished via the administrative program 108 which creates a personal collaborative platform or private room 110 for the renter on the Web site collaborative platform and provides the renter with instructions or "keys" for establishing the link to the private room 110. These keys may include the name of the private room 110, the user name and the user password. This private room 110 allows the renter to communicate and/or transfer information between one or more client computers 104 via a secure connection. It should be appreciated that the private room 110 which may be a sub-web (sub-site) on the Web site collaborative platform that is accessible to the renter via an Internet Protocol (IP) address of the Web server computer, wherein the sub-web is a Web site stored within a named sub-directory of the top level Web site, in this case the collaborative platform. As is known, the IP address may typically be a 32-bit numeric address written as four numbers, wherein each number is between 0 and 255 and each group is separated by a period.

Figure 6:
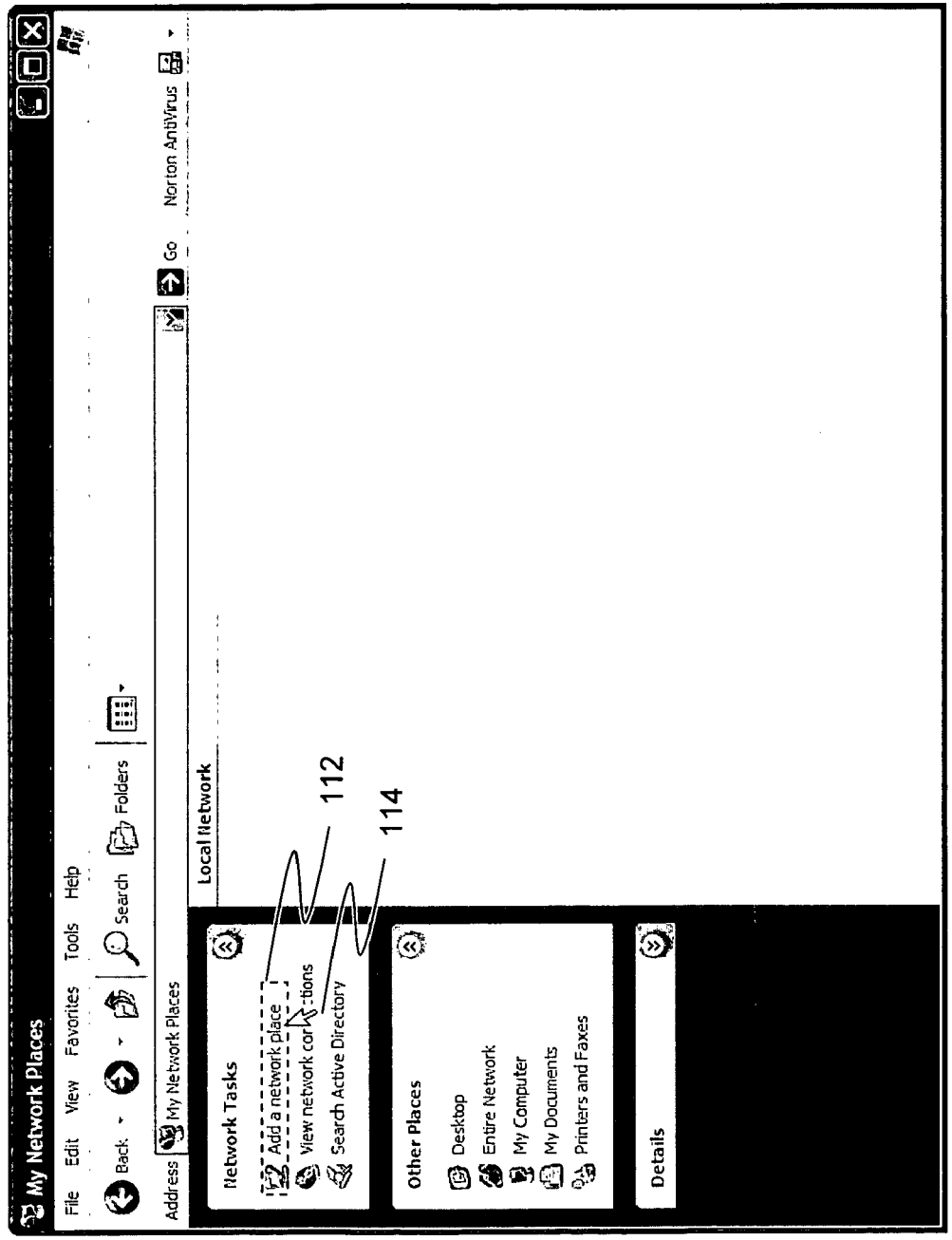
FIG. 6 is a screen shot illustrating the method of FIG. 5.
Figure 7:
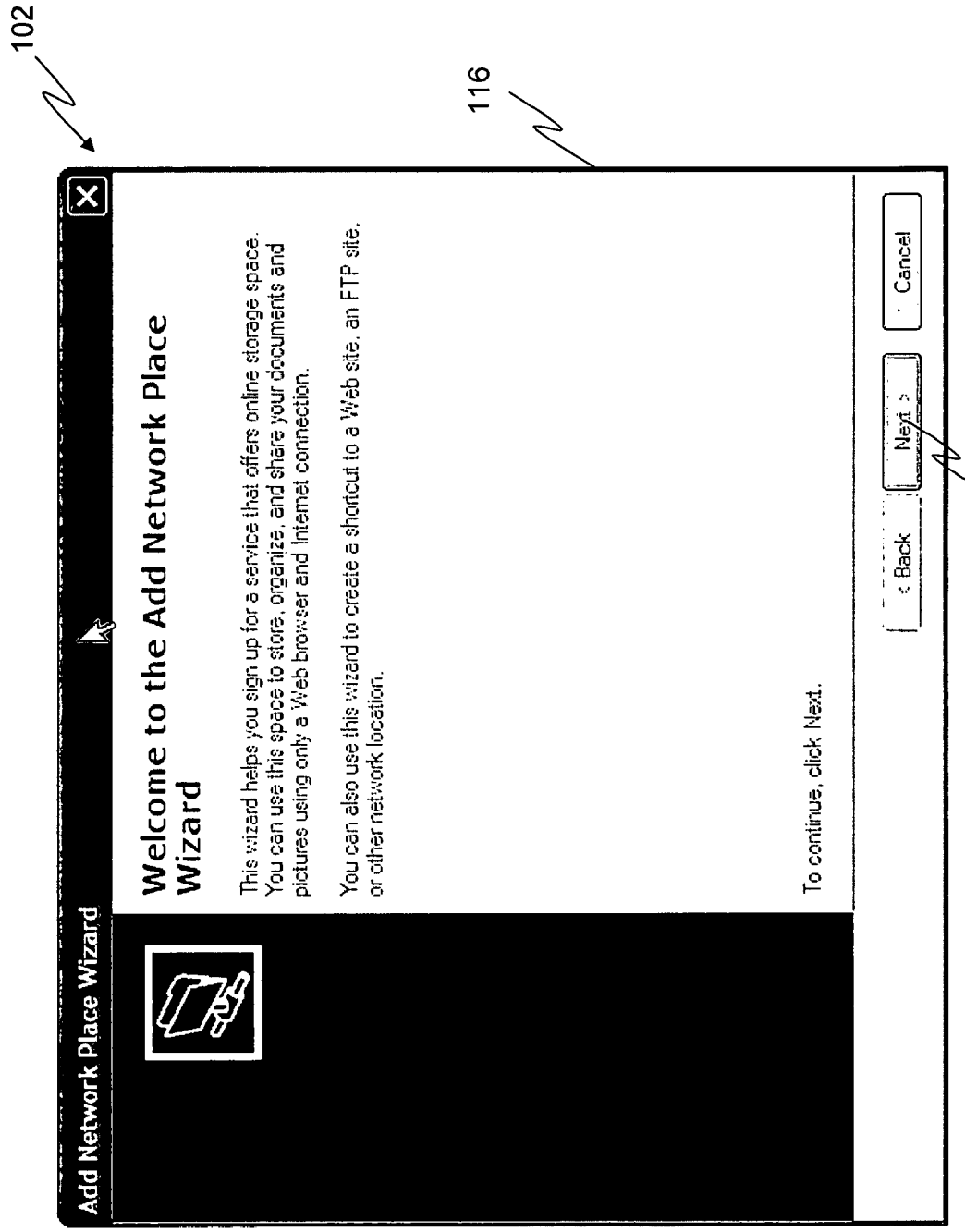
FIG. 7 is a screen shot illustrating the method of FIG. 5.

Once the private room 110 has been created by the administrative program 108, the renter and any users need to establish a communication link to the collaborative environment. One way this may be accomplished is as follows. To establish the communication link between the private room 110 and a user, the user adds the name of the private room 110 to the Network Places folder on the client computer 104, as shown in FIG. 6, which may be accomplished via a plurality of methods depending upon the operating system of the client computer 104 as is well known in the art. For example, for a client computer 104 which uses Microsoft Windows® XP operating system, one method would be to open the "My Network Places" folder and select the "Add a network place" link 112 using the mouse cursor 114. This typically activates the "Add Network Place Wizard" application which is provided by Microsoft Windows® XP and an introductory Network Wizard Graphical User Interface (GUI) screen 116 appears on the desktop of the client computer 104, as shown in FIG. 7, and the user is prompted to select the "Next" link 118.

Figure 8:
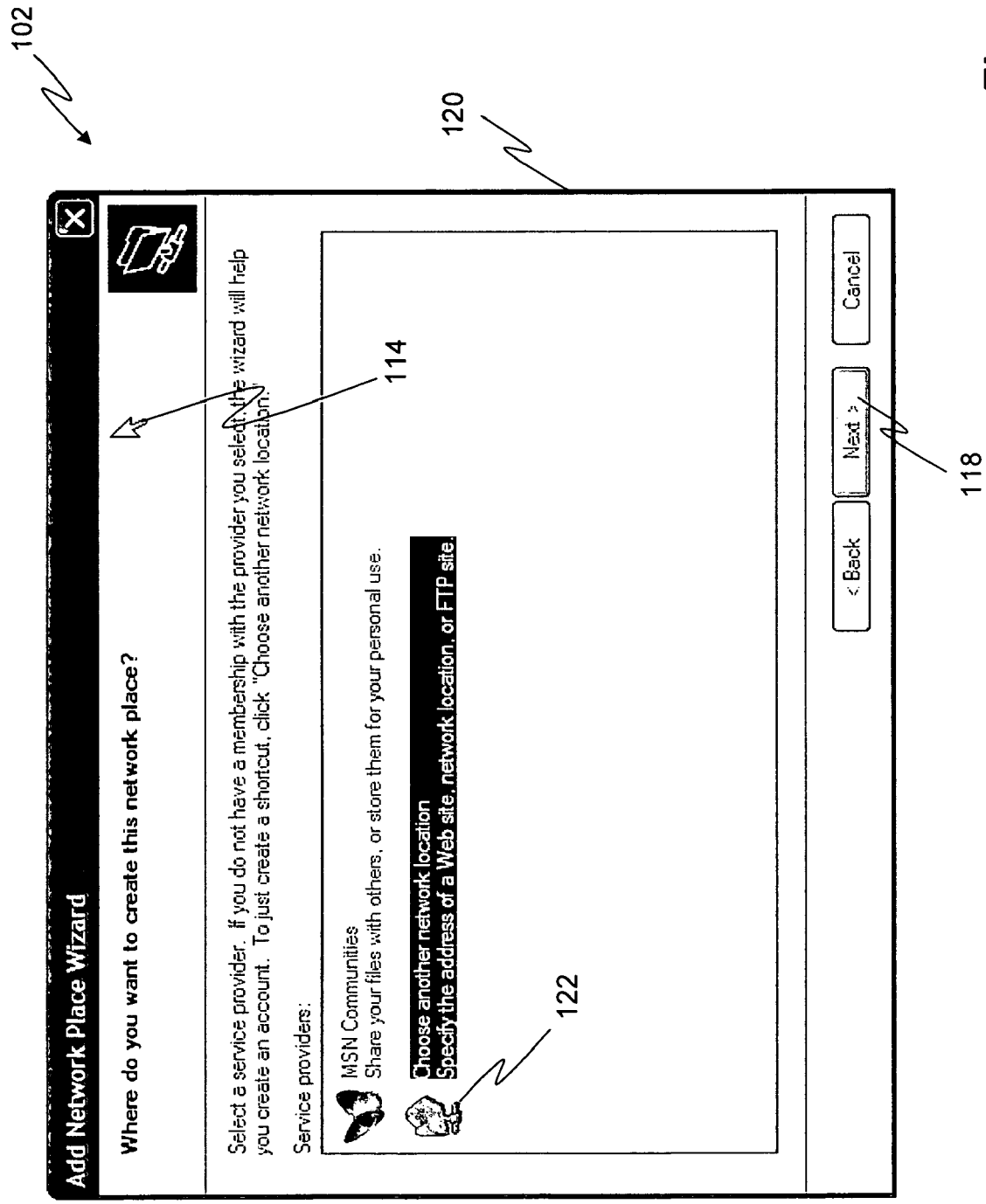
FIG. 8 is a screen shot illustrating the method of FIG. 5.
Figure 9:
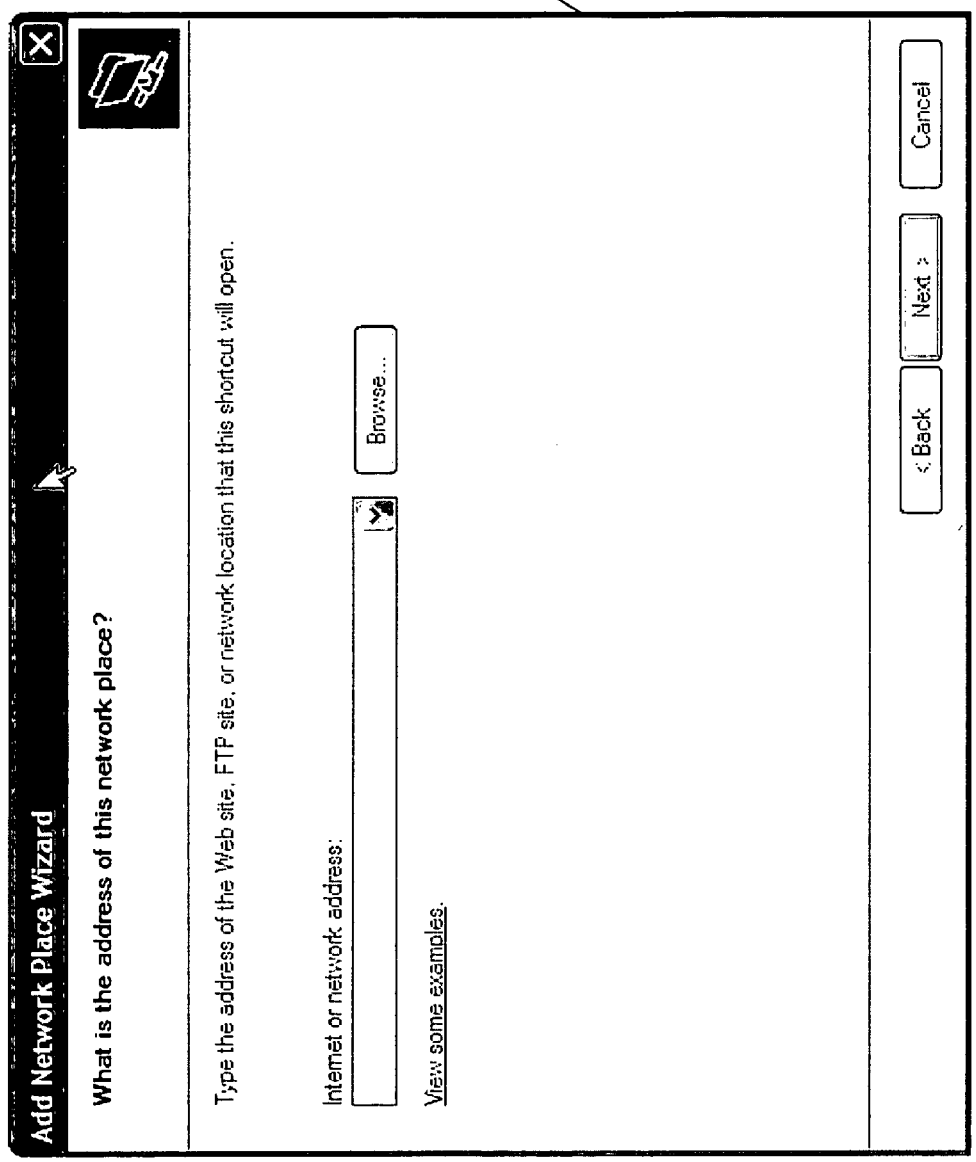
FIG. 9 is a screen shot illustrating the method of FIG. 5.
Figure 10:
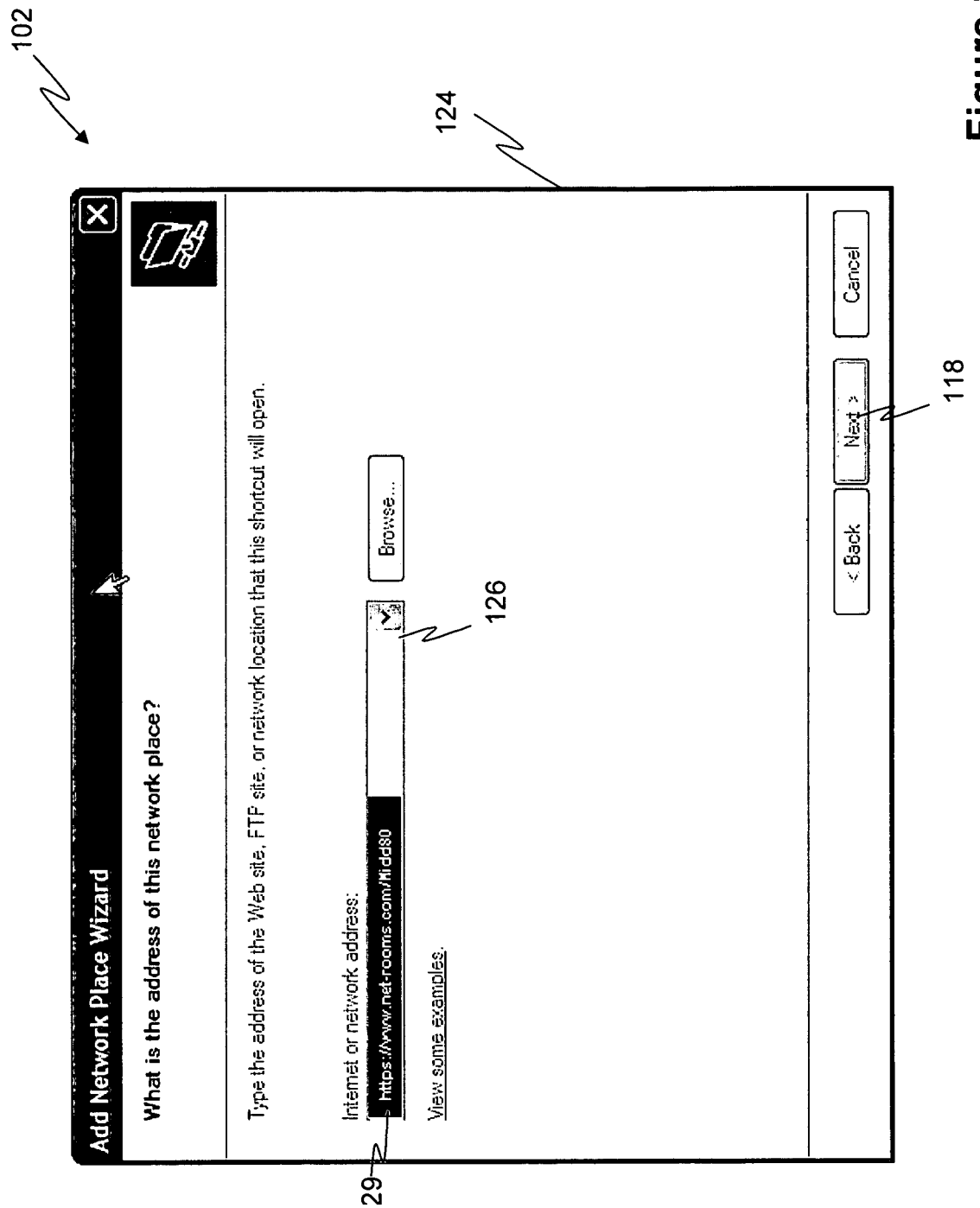
FIG. 10 is a screen shot illustrating the method of FIG. 5.

Upon selecting the "Next" link 118, a service provider selection GUI 120 is displayed and includes a network selection link 122 entitled "Choose another network location." Using the cursor 114, the user should then highlight the network selection link 122, as shown in FIG. 8, and select the "next" link 118. An address GUI 124 will then be displayed to the user and which will prompt the user to enter an address of the network place to be added to the Network Places folder, as shown in FIG. 9. The user then enters the address of the private room 110 on the Web server computer 102 into the address text box 126, as shown in FIG. 10, and selects the "Next" link 118. In this case, the address 129 of the private room 110 on the Web server computer 102 is "www.net-rooms.com/Midd80", wherein the address of the Web server computer 102 is "www.net-rooms.com" and the name of the private room 110 is "Midd80". It should be appreciated that although the connection between the client server 104 and the Web server computer 102 is shown as being of a "Hypertext Transfer Protocol" or "http", other protocols and/or formats may be used, such as "https" and/or "File Transfer Protocol" or "ftp". It should be appreciate that if a secure connection with the back room is desired then the address 129 of the private room 110 should begin with an "https" instead of "http". This provides a certified secure and encrypted link between the renter/user and the back room.

Figure 11:
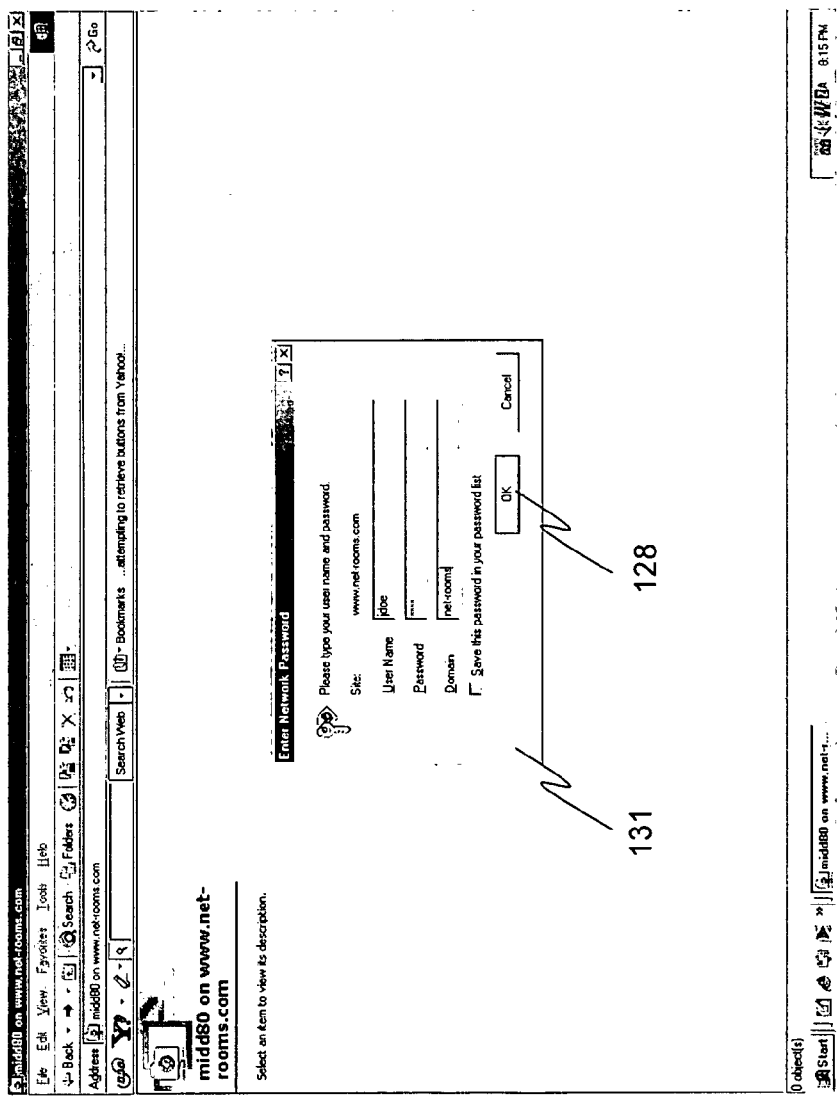
FIG. 11 is a screen shot illustrating the method of FIG. 5.
Figure 12:
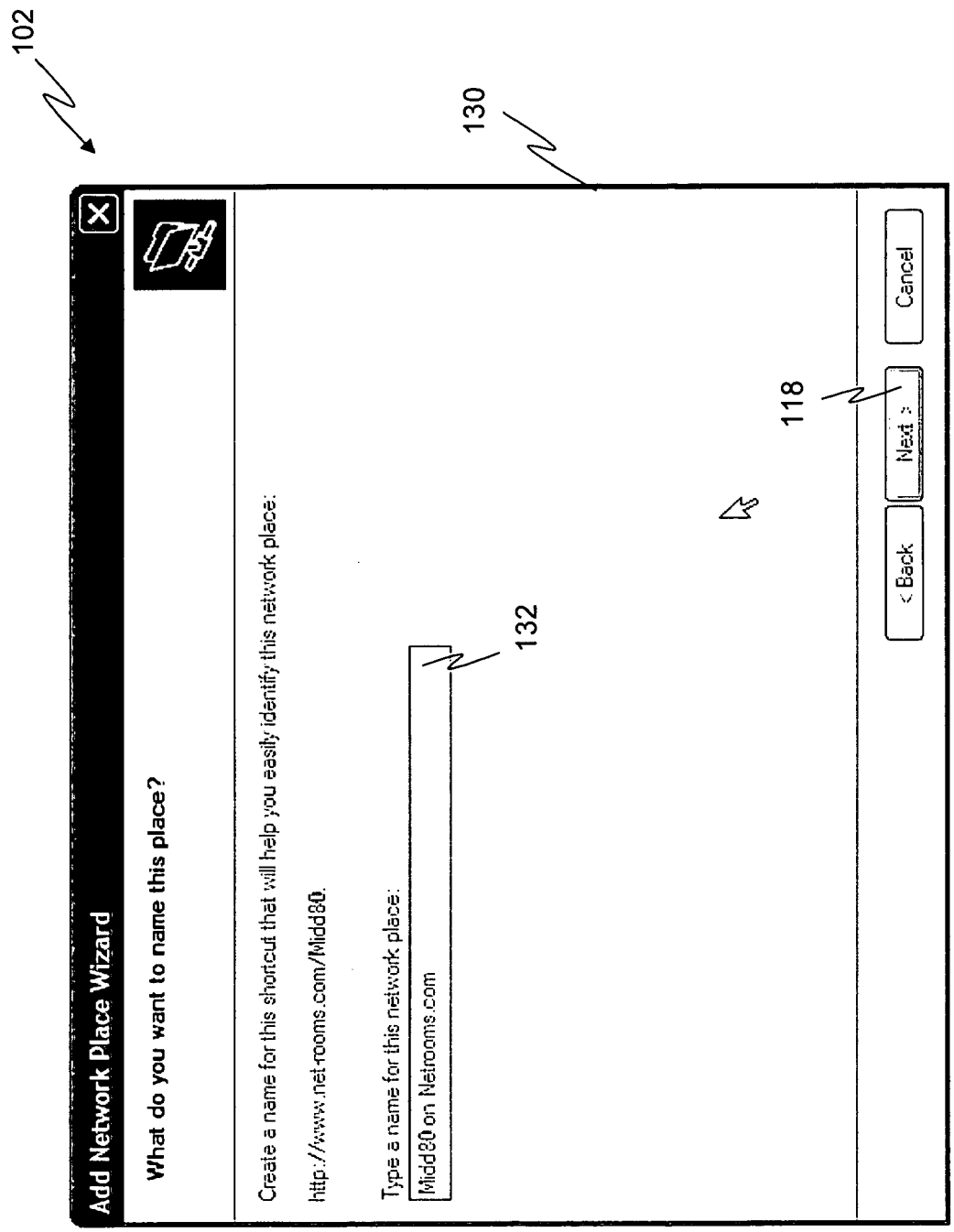
FIG. 12 is a screen shot illustrating the method of FIG. 5.
Figure 13:
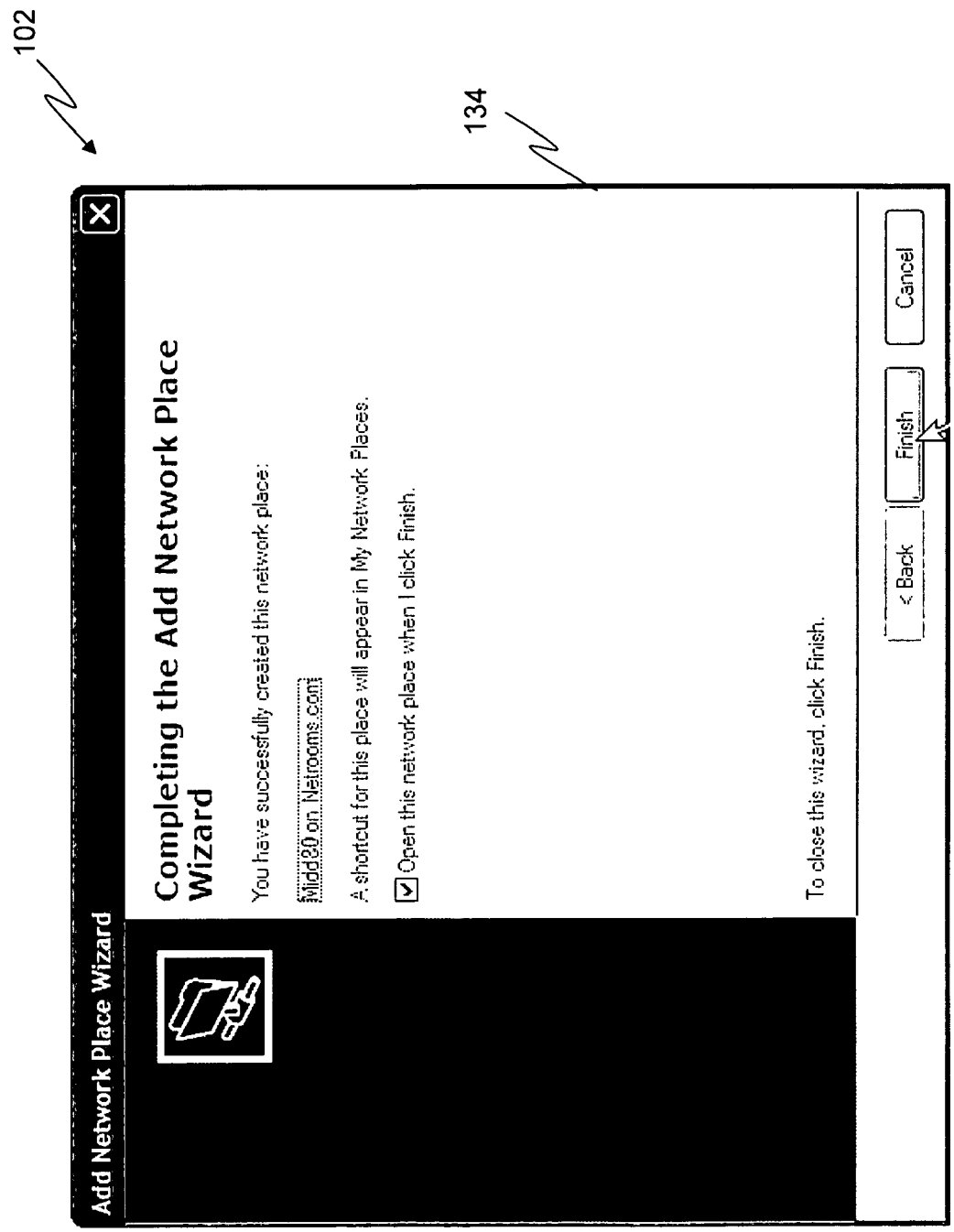
FIG. 13 is a screen shot illustrating the method of FIG. 5.
Figure 14:
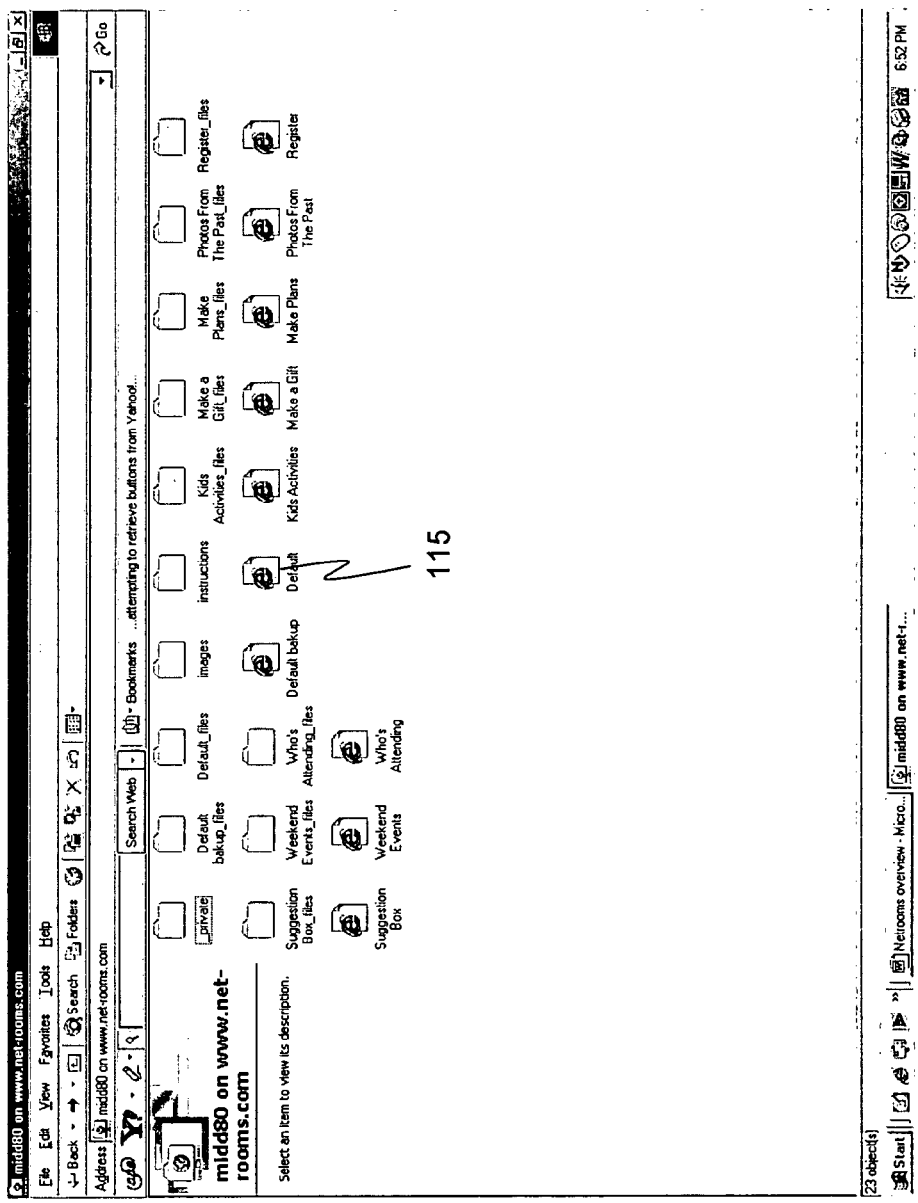
FIG. 14 is a screen shot illustrating the method of FIG. 5.

At this point, the user will be prompted for a username and password, as shown in FIG. 11. The user should enter the assigned user name, assigned password and the domain name (in this case "net-rooms") into the password GUI 131 and select the "OK" link 128. It should be appreciated that the user name and/or password may be assigned automatically via the administrative program 108 or may be selected by the user as discussed hereinafter, wherein if the user name selected by the user is already taken, the administrative program 108 may suggest available user names to the user. The "Add Network Place Wizard" 116 will then display a link name GUI 130 which will prompt the user to create a name for the shortcut link that will be placed on the client computer 104, as shown in FIG. 12. The user should enter a desired shortcut link name into the text box 132, In this case, the name selected is "Midd80 on Netrooms.com", and select the "Next" link 118 at which point the "Add Network Place Wizard" 116 will display a complete setup GUI 134 indicating to the user that the link between the client computer 104 and the Web server computer 102 has been successfully created, as shown in FIG. 13. The user may now freely access the private room 110 by selecting the short cut link "Midd80 on Netrooms.com" using the cursor 114. For example, the user may select the short cut link "Midd80 on Netrooms.com" and navigate to the private room 110 just created which is also referred to as a "back-room", as shown in FIG. 14. The user may transfer information between the back-room 110 and the client computer 104 by any method suitable to the desired end purpose, such as the drag and drop and/or copy and paste functions inherent in Microsoft Windows® operating systems.

Additionally, the user may create and/or modify a front room web page simply by creating and/or modifying a document and saving the document in a desired format, such as a Web page format (i.e. html, htm, etc.) file named default.htm, wherein the document may be Microsoft® Word and/or any other available browser capable software. If a document is in use by another user on the same site it will be opened in read-only mode with a notification. When the document becomes free a notification will be sent back to the client telling them that it is now available and allowing them to open it in read-write mode. This ensures that only one copy of the document is current. However, the collaborative platform may automatically keep previous versions that may be recovered by the administrator if a data corruption occurs. Once the default.htm document has been saved, the user simply needs to transfer the default.htm document to the back room 110. The front room homepage is the default.htm file 113. Using only Microsoft® Word and/or any other software that can create/edit browser compatible documents, the renter may customize the front room homepage by editing the default.htm file, adding text, embedding images, linking to files residing in the back room, creating other html/htm pages and linking to them and/or linking to other sites internal and/or external to the collaborative environment. The user adds the name of the recently saved document to the default.htm file 113 and, using standard Microsoft® Windows functionality, links the name to the saved document. The user then saves the default.htm file 113.

Additionally, the renter may set the permission level for users of the private room 110 as desired by either requesting the administrative program 108 to set the permissions and/or by setting the permissions themselves, as desired. If the renter desires the permission level to be set by the administrative program 108, then the renter may contact the administrative program and communicate the desired permission level. However, if the renter desires to set the permission level, then the renter may access an administrative page, as discussed further hereinafter, for the private room 110 and set the permission level for each individual user and/or groups of users. It should be appreciated that the permission level may include a plurality of levels which control the actions of each client computer 104 and/or user. Although, the permission levels are discussed herein as being comprised of an administrator level, an author level and a browser level, several different levels of permissions may be used and/or created as desired. Additionally, these permission levels may be configured in any configuration as desired.

Figure 15:
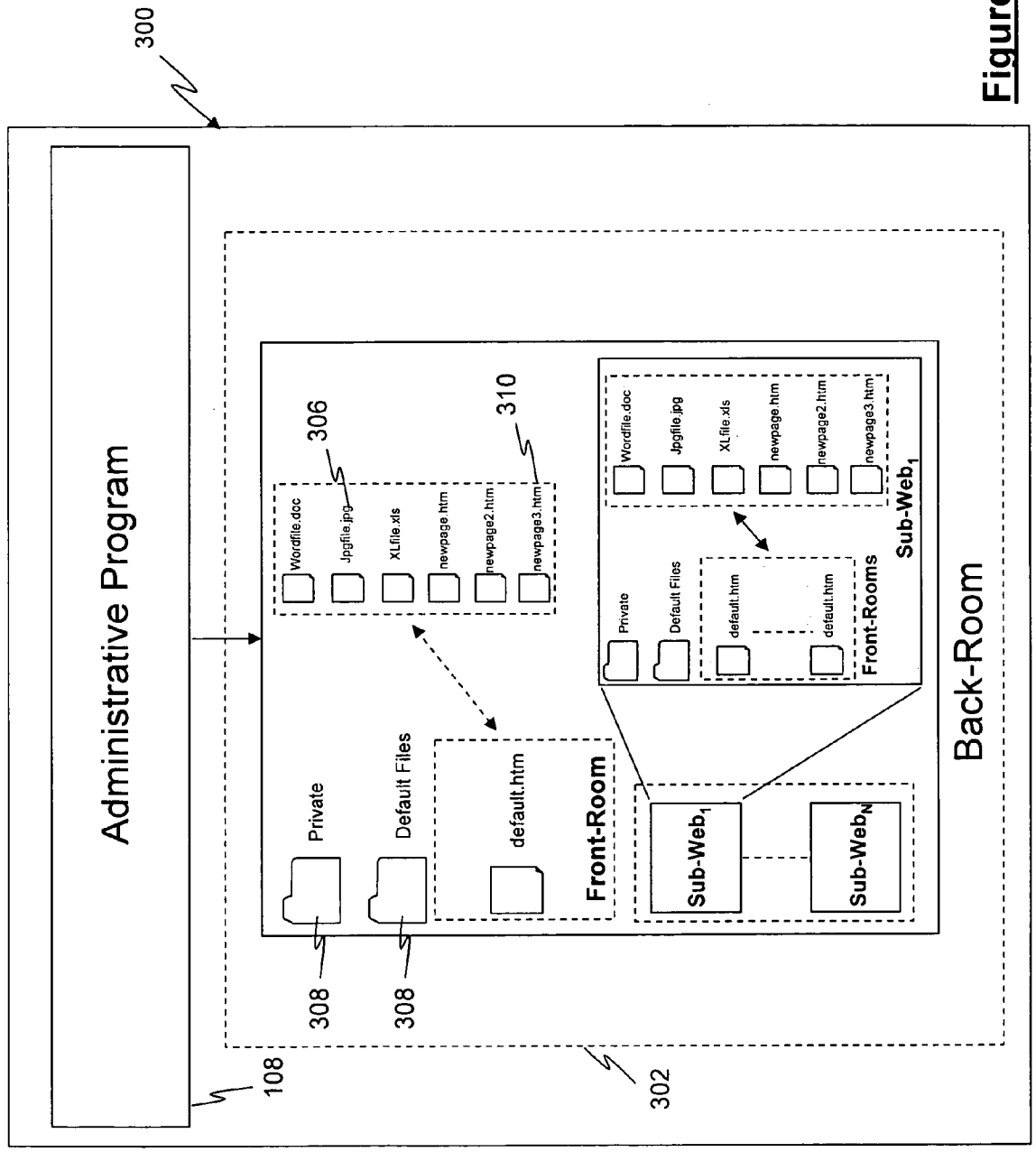
FIG. 15 is a schematic block diagram depicting the collaborative platform of FIG. 3.

One way to configure the permission levels for a Web site collaborative platform 300 might be via a private room administration page, as discussed further hereinafter, provided by the administrative program 108 and accessible by the renter and/or other user having global administrator permission which would allow the renter to configure permission levels as desired without third party intervention. It is contemplated that permission levels may include global and local permissions as described as follows. For example, referring to FIG. 15, if a private room 302 is created on the Web site collaborative platform 300 and a user is assigned a permission level of global browser for the entire (i.e. global) private room 302, then the user may browse the contents of the private room 302, such as files 306, folders 308 and/or web pages 310 but may not make any changes to the private room 302 or any of its contents. On the other hand, if the user 304 is assigned a permission level of limited or local browser then the user may only browse the contents of files and/or folders as selected by the renter.

This applies to author permission level as well. For example, referring again to FIG. 15, if a private room 302 is created on the Web site collaborative platform 300 and a user 304 is assigned a permission level of global author for the entire (i.e. global) private room 302, then the user 304 may modify the contents of the private room 302, such as files 306, folders 308 and/or web pages 310, but may not create and/or delete any of the files, folders and/or web pages of the private room 302. On the other hand, if the user 304 is assigned a permission level of limited or local author then the user may only modify the contents of files and/or folders as selected by the renter. Similarly, a user assigned a permission level of global administrator may create, delete and/or modify all parameters of the private room 302 as the renter, while a user 304 assigned a permission level of limited or local administrator may only modify the parameters of the contents of files and/or folders as selected by the renter and/or a user assigned a permission level of global administrator. It should be appreciated that each sub-web may have administration, authoring and browsing permission levels that may be independent from the top-level Web site and/or other sub-webs. Additionally, each sub-web may contain as many sub-webs as desired.

Referring to FIG. 16, one example of a private room administration page or Net-Rooms™ administration tool for allowing a renter to independently control the security and administration of each collaborative back room folder environment (i.e. private room) is shown. This private room administration page may be a Web based administrator program that uses any devices, services and programs suitable to the desired end purpose, such as Microsoft® SharePoint Services, Microsoft® IIS, Microsoft® ASP, and SharePoint Services SDK. As shown the private room administration page may provide the renter the capability to configure how the activities regarding access and permissions of groups and/or individuals (Users and Roles) are set, configure how the usages statistics are collected, compiled and/or reported (Configure Usage Analysis), determine, detect and/or monitor whether problems in the overall and/or selected areas of the (i.e. global and/or local) environment exist and whether any unauthorized attempts to enter the environment (hacking) has occurred and any tracking data available to the renter (Server Health), activate, create and/or maintain versioning information for individual pages, files, folders and/or documents (Version Control) and to create, maintain, configure and/or administer sub webs of the collaborative back room folder environment (private room) for each private room, wherein these private rooms may be dependent upon the parent (i.e. top level or main private room) for its security or they may have independent security models as desired by the renter (Subwebs). Additionally, the private room may include the capability to automate functions, such as mirroring Webdav security in ftp and default page creation.

In accordance with the present invention, the Web server computer 102 may be any one or more computers configured to provide access to net-room's files, folders or Web pages in response to a request from at least one client. It should be appreciated that the Web server computer 102 may be comprised of a single server computer or multiple server computers (e.g. a server farm) disposed in one or several different locations. Moreover, the Web server may be a virtual Web server which resides on a single computer along with other virtual Web servers, wherein the Web server may appear to the renter as a separate Web server. Each virtual Web server may be capable of running networked or locally resident programs, in tandem with other Web servers and/or individually, and each virtual Web server may be configured to provide individualized access to input and peripheral devices, either locally and/or remotely. Moreover, each virtual Web server can have its own domain name and IP address.

It should be appreciated that the administrative program 108 may use any commercially available programs that support Internet functions, such as Web site creation, configuration and management. Additionally, the programs should support and/or allow the creation of dynamic Web content and/or Web based applications and/or allow customization for the development of Windows® SharePoint Services. For example, program applications may include, but be limited to, Microsoft® Sharepoint Services, Microsoft® Internet Information Services (IIS), Microsoft® Active Server Pages (ASP) and Microsoft® Sharepoint Services Software Development Kit (SDK). It is also contemplated that the collaborative platform may be configured for real time data transfer and voice communication to allow collaboration to occur on a real time basis.

Each private room may comprise at least one of a front room and a back room and may be easily configured by a non-technical renter using a client computer 104. Any type of configuration may be employed, however in general, the front room may be the Web site as it is visible on the client computer 104 to users that have browser status but that do not have author status. The back room, which may be visible on the client computer 104 to users that have author status, includes the various folders, files, pages, documents and the like that are shared among authors. The back room may also contain Web pages if the author chooses to set up a front room Web site, wherein the front room typically includes a home page ("default.html") and may and/or may not have a link to files/folders within the backroom. The home page is typically the first page visible to a visitor of a Web site and the various html pages, including the home page, may be linked to data items located in the back room, wherein the data items may be stored in a storage device located locally or remotely.

In accordance with the present invention, the collaborative platform allows renters to easily share their thoughts and digital information with others (or just themselves) by providing for the rapid delivery of a secure private room 112 that may be encrypted, password protected and/or virus protected, wherein the private room 112 is easy to operate (i.e. self-service) and maintained by non-technical renters. Additionally, the private room 112 is easy to create and to set up for the information exchange and collaboration with others over the Internet and may be rented for a predetermined period of time, such as on an hourly, daily, weekly, monthly and/or yearly basis.

A machine-readable computer program code and/or a medium encoded with a machine-readable computer program code for creating and/or operating the collaborative platform, the code and/or medium including instructions for causing a controller to implement a method for creating and/or operating the collaborative platform is provided. In accordance with an exemplary embodiment, the processing of the present invention may be implemented by a controller disposed internal, external or internally and externally to the Web server. In addition, processing of the present invention may be implemented through a controller operating in response to a computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

The invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system for providing a collaborative platform to facilitate communication between a plurality of computers using an internet browser, the system comprising:
   a processing unit configured to:
      create a collaborative back room folder environment on a server computer in response to a request from a renter,
         wherein said collaborative back room folder environment includes at least one configurable parameter, and wherein said collaborative back room folder environment is configured to allow direct access to said collaborative back room folder environment via an internet browser; and
         wherein said collaborative back room folder environment is further configured to allow said renter to create and configure the layout of a front room web page environment, said front web page room environment being associated with said collaborative back room folder environment such that said collaborative back room folder environment is accessible via said front room web page environment, wherein said front room web page environment is configurable to control access to said collaborative back room folder environment, and wherein at least one of said collaborative back room folder environment and said front room web page environment is further configured to support an exchange of information between at least one of the plurality of computers and at least one of said collaborative back room folder environment and said front room web page environment, said exchange of information being configurable by said renter, wherein said information is located in at least one of said collaborative back room folder environment, said front room web page environment and on an external storage device, and wherein said collaborative back room folder environment is further configured to support a sub-web having a sub-collaborative back room folder environment and being accessible via a sub-front room web page environment, said sub-web being creatable by said renter and directly accessible via an internet browser.

2. The system of claim 1, wherein said at least one parameter is configurable by at least one of an administrator and said renter using an administration tool.

3. The system of claim 2, wherein said at least one parameter includes at least one of user addition/deletion, user role, usage analysis, server health, version control and subweb parameters, wherein said administration tool is accessible to at least one of said administrator and said renter.

4. The system of claim 1, wherein said collaborative back room folder environment includes at least one of a folder, a file, a said front room web page environment and a sub collaborative back room folder environment.

5. The system of claim 1, wherein said front room web page environment is associated with at least one of said folder, said file and said sub collaborative back room folder environment via a hyper link included within said front room web page environment.

6. The system of claim 1, wherein said front room web page environment is configurable by at least one of a user and said renter.

7. The system of claim 1, wherein said front room web page environment and said back room folder environment is accessible via at least one of an Intranet, an Extranet and the Internet.

8. The system of claim 1, wherein said at least one parameter is a user permission level configurable by at least one of an administrator and said renter and assignable to a user, wherein said user permission level includes at least one of a global administrator permission level, a local administrator permission level, a global author permission level, a local author permission level a global browser permission level and a local browser permission level.

9. The system of claim 1, wherein said collaborative back room folder environment is configured to monitor activity by a user and provide report of said activity to said renter.

10. The system of claim 1, wherein said collaborative back room folder environment is configurable via at least one common computer application.

11. The system of claim 10, wherein said at least one common computer application includes at least one of Microsoft® Network Neighborhood, Microsoft® Word, Microsoft® Excel, Microsoft® Works and Corel WordPerfect.

12. The system of claim 1, wherein said collaborative back room folder environment is mapped as a network on at least one of said plurality of computers using existing operating system software, wherein said server is communicated with said collaborative back room folder environment via at least one of a secure and an unsecure communications link.

13. A method for providing a collaboration platform to facilitate communication between a plurality of computers using an internet browser, the method comprising:

receiving a request from a renter to create a collaborative back room folder environment; and creating said collaborative back room folder environment on a server computer in response to said request, wherein the collaborative back room folder environment includes:

at least one configurable parameter, and wherein said collaborative back room folder environment is configured to allow direct access to said collaborative back room folder environment via an Internet browser, and wherein said collaborative back room folder environment is further configured to allow said renter to create a front room web page environment, said front web vane room environment being associated with said collaborative back room folder environment such that said collaborative back room folder environment is accessible via said front room web page environment, wherein said front room web page environment is configurable to control access to said collaborative back room folder environment, and wherein at least one of said collaborative back room folder environment and said front room web page environment is further configured to support an exchange of information between at least one of a plurality of computers and at least one of said collaborative back room folder environment and said front room web page environment, said exchange of information being configurable by said renter, wherein said information is located in at least one of said collaborative back room folder environment, said front room web page environment or on an external storage device, and wherein said collaborative back room folder environment is further configured to support a sub-web having a sub-collaborative back room folder environment and being accessible via a sub-front room web page environment, said sub-web being creatable by said renter and directly accessible via an internet browser.

14. The method of claim 13, further comprising:
assigning a predetermined permission level to a user, wherein user access to at least one of said collaborative back room folder environment and said front room web page environment is responsive to said predetermined permission level assigned to said user.

15. The method of claim 13, further comprising:
mapping said collaborative back room folder environment as a network, using existing operating system software, onto at least one of said plurality of computers.

16. The method of claim 13, further comprising:
monitoring all user activity while in the collaborative back room folder environment.

17. The method of claim 13, further comprising:
configuring at least a portion of said collaborative back room folder environment using at least one of Microsoft® Network Neighborhood, Microsoft® Word, Microsoft® Excel, Microsoft® Works and Corel WordPerfect.

18. The method of claim 13, further comprising:
creating said front room web page environment.

19. The method of claim 13, wherein said front room web page environment is associated with at least one of a folder, a file and a sub collaborative back room folder environment via a hyper link included within said front room web page environment.

20. A machine readable computer program code encoded onto a storage medium, the program code including instructions for causing a controller to implement a method for providing a Web-based collaboration platform to facilitate communication between a plurality of computers using an internet browser, the method comprising:

receiving a request from a renter to create a collaborative back room folder environment; and creating said collaborative back room folder environment on a server computer in response to said request, wherein the collaborative back room folder environment includes:

at least one configurable parameter, wherein said collaborative back room folder environment is configured to allow direct access to said collaborative back room folder environment via an internet browser, and wherein said collaborative back room folder environment is further configured to allow said renter to create a front room web pane environment, said front web pane room environment being associated with said collaborative back room folder environment such that said collaborative back room folder environment is accessible via said front room web page environment, wherein said front room web page environment is configurable to control access to said collaborative back room folder environment, and wherein at least one of said collaborative back room folder environment and said front room web page environment is further configured to support an exchange of information between at least one of a plurality of computers and at least one of said collaborative back room folder environment and said front room web page environment said exchange of information being configurable by said renter, wherein said information is located in at least one of said collaborative back room folder environment, said front room web pane environment or on an external storage device, and wherein said collaborative back room folder environment is further configured to support a sub-web having a sub-collaborative back room folder environment and being accessible via a sub-front room web pane environment said sub-web being creatable by said renter and directly accessible via an internet browser.

* * * * *